United States Patent [19]
Seaton et al.

[11] Patent Number: 5,795,093
[45] Date of Patent: Aug. 18, 1998

[54] SUBSEA CLAMP

[75] Inventors: Russell Seaton, London; Philip Michael Howe, Berkshire, both of Great Britain

[73] Assignee: Kvaerner FSSL Limited, London, United Kingdom

[21] Appl. No.: 757,767

[22] Filed: Nov. 27, 1996

[30] Foreign Application Priority Data

Dec. 6, 1919 [GB] United Kingdom ............. 9524976.9

[51] Int. Cl.⁶ .................................................. B25G 3/18
[52] U.S. Cl. ............................ 403/322; 403/320; 403/328; 403/374; 166/338
[58] Field of Search ........................... 403/320, 321, 403/322, 325, 326, 328, 374, 13, 24, 338; 166/338

[56] References Cited

U.S. PATENT DOCUMENTS

| | | |
|---|---|---|
| 4,198,080 | 4/1980 | Carpenter ........................ 403/325 X |
| 4,585,369 | 4/1986 | Manesse et al. ................... 403/322 |
| 4,648,629 | 3/1987 | Baugh ........................... 403/322 X |
| 4,708,524 | 11/1987 | Goris ........................... 403/322 X |
| 4,828,035 | 5/1989 | McInturff ....................... 403/322 X |
| 5,107,930 | 4/1992 | Hopper ......................... 403/322 X |
| 5,188,483 | 2/1993 | Kopp et al. ..................... 405/191 |
| 5,320,175 | 6/1994 | Ritter et al. .................... 166/339 |
| 5,372,199 | 12/1994 | Cegielski et al. ................. 166/368 |
| 5,398,946 | 3/1995 | Quiring ......................... 403/325 X |
| 5,439,310 | 8/1995 | Evenson et al. ................... 403/24 X |

Primary Examiner—Daniel P. Stodola
Assistant Examiner—Bruce A. Lev
Attorney, Agent, or Firm—Nixon & Vanderhye

[57] ABSTRACT

A subsea clamp comprising a drive member and an attachment member for location on respective ones of a first and second subsea structure. The drive member and attachment member can be wedged together by a locking member. In preferred embodiments the locking member is a collet with a deflectable end that can be moved longitudinally from a first position in which it is free to a second position where it wedges the drive member in the attachment member.

15 Claims, 4 Drawing Sheets

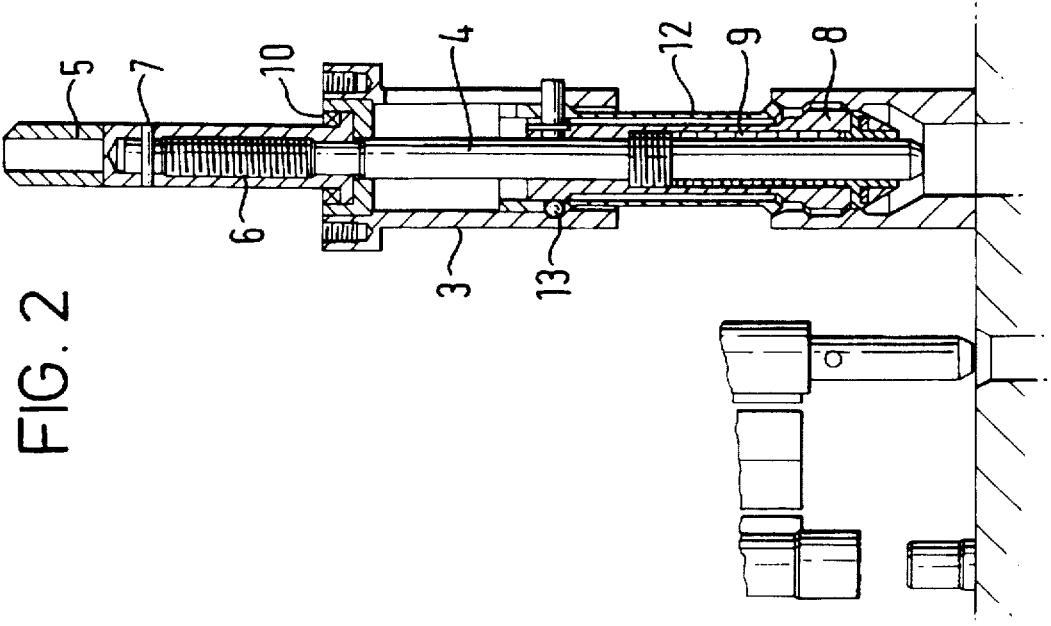
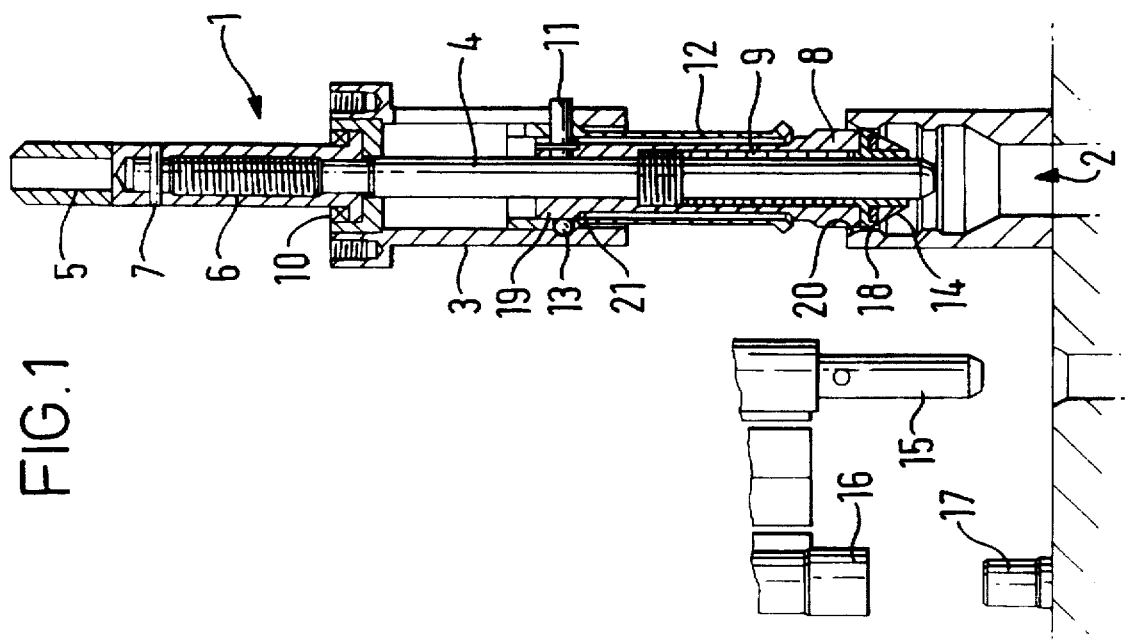

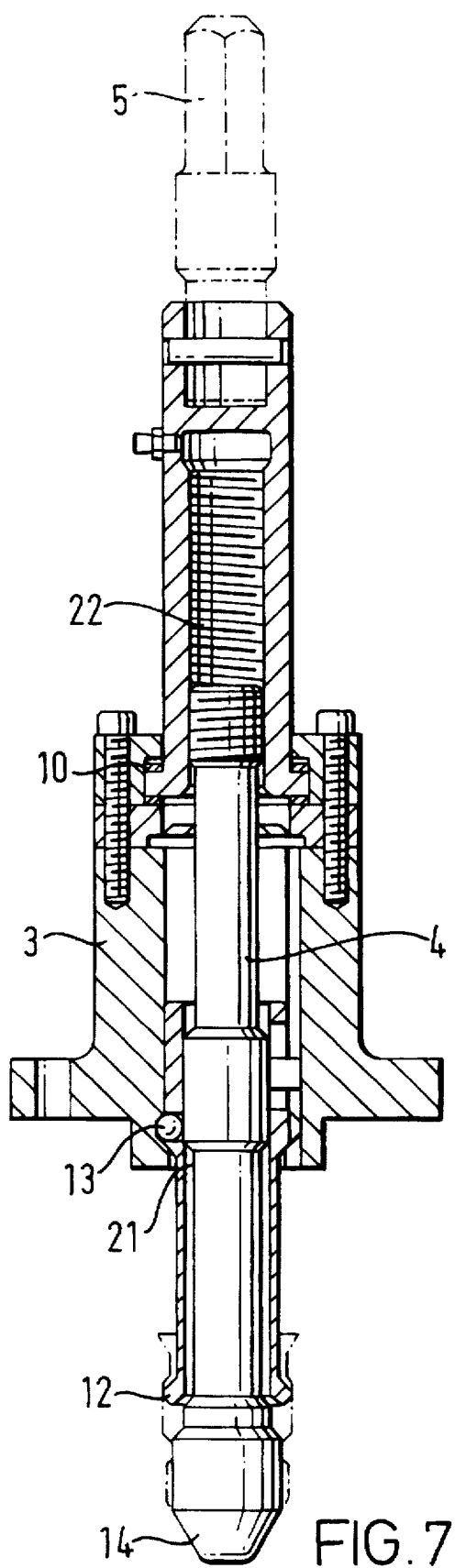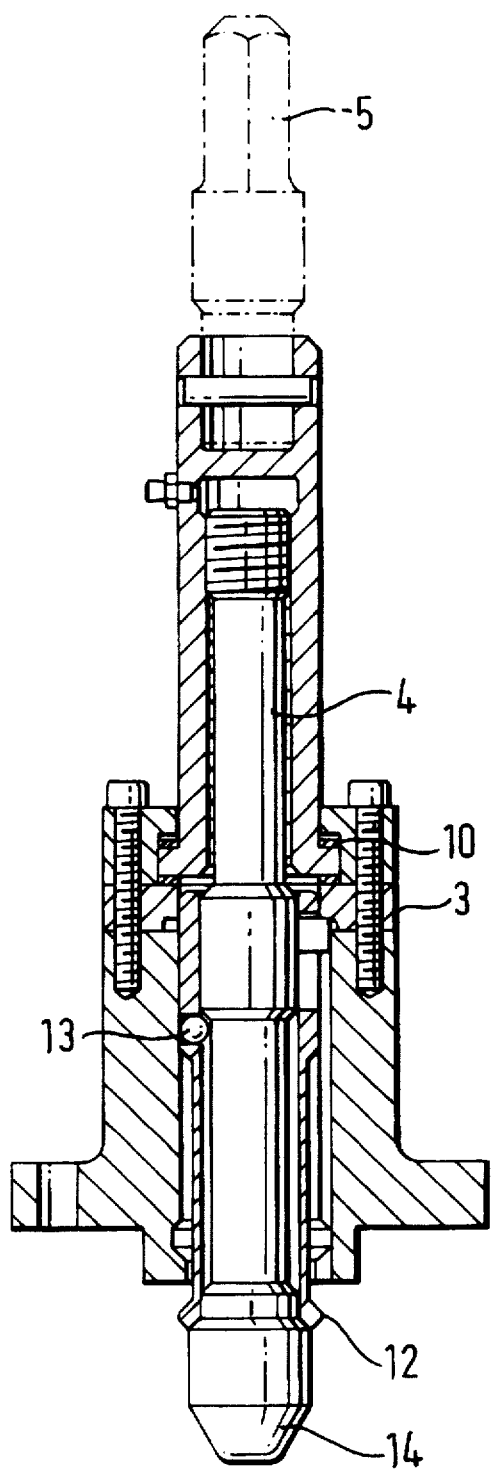
FIG. 7
FIG. 8

SUBSEA CLAMP

This invention relates to clamps and especially to clamps for retaining deployed packages on subsea structures.

In various subsea systems it is necessary to secure packages such as control modules to an existing structure and make hydraulic and/or electrical couplings. It is desirable to be able to release the clamps for subsequent removal of the modules, perhaps a significant time later. Therefore the clamps need to constitute a mechanism for both bringing together the module and subsea structure against resistive forces and also for separating the module and subsea structures.

An existing clamp for this purpose comprises a receptacle mounted on the subsea structure which engages with a splined cruciform end of a bolt assembly. The bolt assembly has a nut which can be screwed along a thread on the bolt shaft urging a yoke, and any attached module, closer to or away from the cruciform end of the bolt. To engage the end of the bolt in the receptacle the splined end is passed all the way through a cruciform aperture in an anchor plate on the receptacle and the splined end is then rotated 45° to prevent withdrawal. The ends of the splines bear against the anchor plate in a load bearing arrangement as the nut is tightened to clamp the module.

A disadvantage with such an arrangement is that it can be difficult to align the cruciform splines and plate, and once the splines are in engagement with the underside of the plate there is a limited load bearing area. It is also necessary to rotate the bolt assembly for engagement and disengagement of the splines and apertured plate.

The present invention is directed towards providing a clamp assembly that is simple to engage and simpler to manufacture.

Accordingly the invention provides a clamp for clamping subsea structures, the clamp comprising a drive member for mounting to a first subsea structure an attachment member for mounting on a second subsea structure, and a locking member disposed such that it is releasably engageable between the drive member and attachment member by a relative longitudinal movement with respect to the drive member.

The invention is now described by way of example with reference to the accompanying drawings in which:

FIG. 1 is a cross-sectional diagram of an embodiment of a clamp according to the present invention positioned adjacent a receiving receptacle immediately prior to commencement of a clamping operation;

FIG. 2 shows the clamp of FIG. 1 at a first stage of the clamping operation;

FIG. 7 shows an alternative embodiment of a clamp according to the invention with the clamp fully inserted into the receptacle; and FIG. 8 shows the clamp of FIG. 7 in the fully clamped position.

Figure 3:
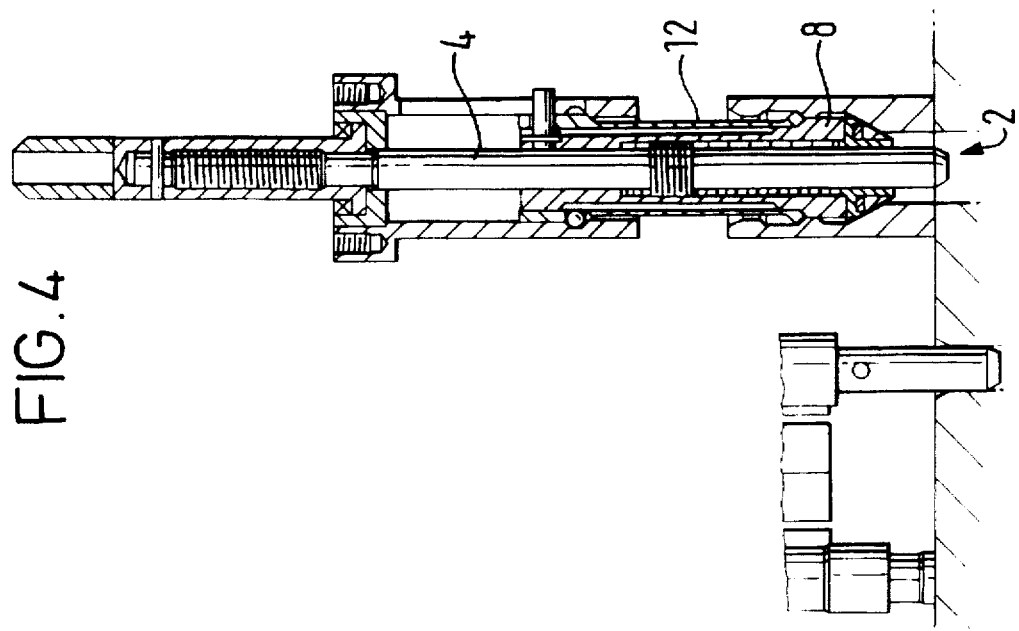
FIG. 3 shows the clamp of FIG. 1 at a second stage of the clamping operation with the clamp fully inserted into the receptacle.

In the following description a clamp is described in a vertical position, which means that downward movement is gravity aided. In other orientations the clamp operates similarly but the clamp mechanism provides force instead of, or to counter, gravity aided movement.

Referring to FIG. 1, a clamp assembly comprises a male clamp part 1 which can be engaged into a receptacle part 2. The male clamp part 1 is generally attached via a clamp housing 3 to a package which is to be deployed. When deployed the package is secured to a subsea structure which carries the receptacle 2.

The male clamp part 1 comprises an elongate drive rod 4 which engages at its upper end with a drive nut 5 via a thread 6 and drive pin 7 and at its lower end with a clamp nut 8 via a thread 9. Attachment of the clamp part 1 to the housing 3 is via a bearing 10 in which the drive nut is rotatably journalled. An anti-rotation pin 11 interconnects the housing 3 and the clamp nut 8 so that when the drive nut is rotated the drive rod 4 rotates with respect to the clamp nut and the clamp nut 8 is effectively screwed up or down along the drive rod 4.

Externally of the clamp nut 8 there is a collet 12, the lower end of which is turned outwardly and is free to spring inwardly and outwardly and the upper end of which carries a locking or detent arrangement, such as detent balls 13 which engage in sockets inside the housing 3.

The lower end of the clamp nut 8 is provided with a conical nose 14 which acts as a coarse guide for locating the clamp into the circular opening of receptacle 2. A fine guide pin 15 is provided on the package which can subsequently engage into an aperture on the subsea structure as the clamp is tightened to align connectors and couplings 16, 17 on the package and subsea structure.

Starting with the position shown in FIG. 1, the sequence of operation to tighten the clamp and secure the package to the subsea structure will now be described. The package and clamp are lowered into the position shown in FIG. 1 with the clamp nose 14 locating in the upper end of the receptacle 2 and by virtue of its conical shape centring the male part of the clamp in the receptacle and aligning the fine guide pin with its aperture.

As the package continues to be lowered to the position shown in FIG. 2, the clamp nut 8 enters the receptacle 2 and the leading edge of the outwardly flared end of the collet 12 engages with an inward chamfer 20 on the receptacle opening and springs the leaves of the collet inwardly so that they can slide past an upper retaining ridge 18 on the receptacle 2 and spring outwardly below the ridge 18 as shown in FIG. 3. At this point the nose 14 has come to rest on the lower profile of the receptacle and the fine alignment pins have entered the guide aperture son the subsea structure. The connectors and couplings have not yet engaged and the drive nut has not yet been rotated.

Figure 4:
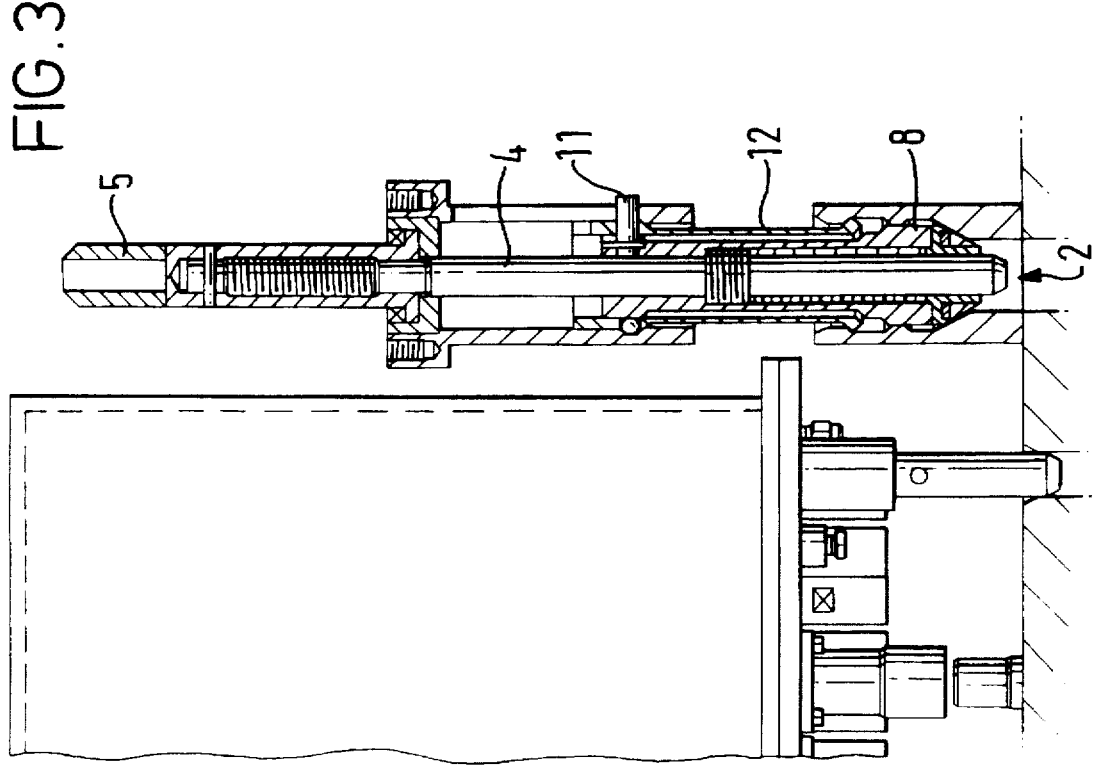
FIG. 4 shows the clamp of FIG. 1 at a third stage of the clamping operation when active manipulation of the clamp assembly is commenced.

Progression from the position in FIG. 3 to the position in FIG. 4 in which the outwardly flared end of the collet has moved down to abut a correspondingly shaped profile 21 on the clamp nut is achieved by clockwise rotation of the drive nut. The drive nut rotation causes the projecting end of the drive rod 4 to extend further through the clamp nose 14 with the clamp nut engaging further up the thread 9. This reduces the length between the housing 3 and the receptacle 2 which does several things. First, the package is lowered further so that the connectors and couplings 16, 17 start to engage. In the vertical orientation gravity helps lower the package, in say a horizontal orientation the tightening of the clamp would urge the two parts together. Second, as the housing 3 is lowered with respect to the clamp nut 8, the collet which is attached to the housing via engagement of detent balls 13 is also lowered until the lower end of the collet engages with the correspondingly configured contour on the clamp nut, which then prevents the collet from flexing inwardly. Just as this latter engagement of the collet takes plate, the detent balls are released by virtue of a retaining large diameter portion 19 on the upper end of the clamp nut moving upwardly and out of engagement with the balls. It will be appreciated from this that the collet is essentially a floating collet that is releasably held in turn by its lower then upper end as rotation of the drive nut retracts the clamp nut and housing towards one another.

Figure 5:
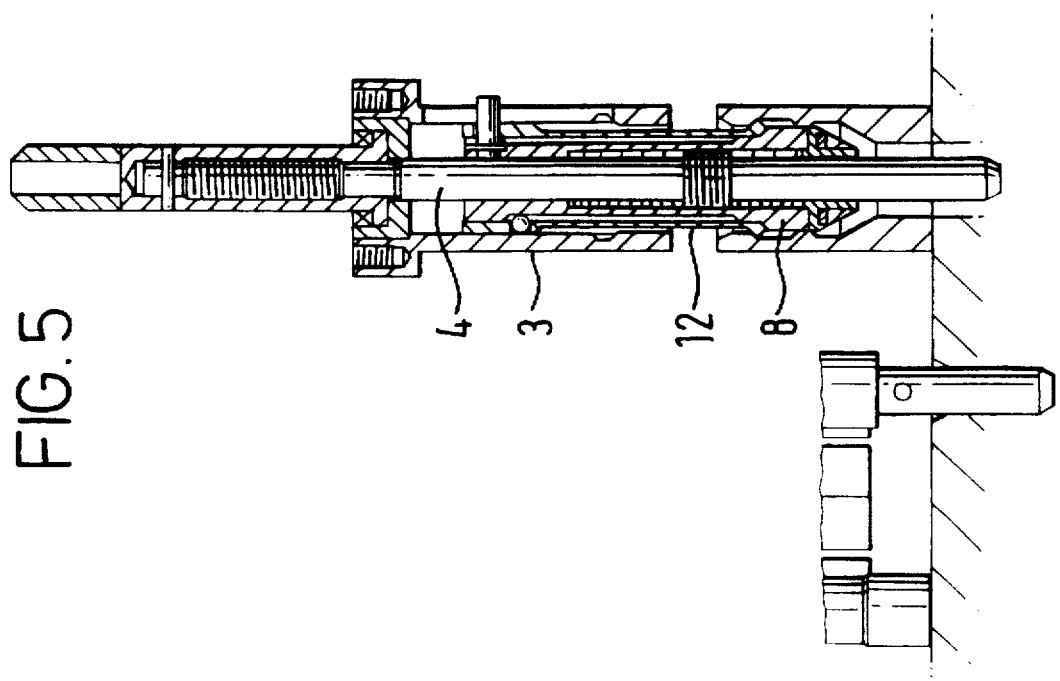
FIG. 5 shows the clamp of FIG. 1 at a fourth stage of the clamping operation.

Further rotation of the drive nut retracts the housing and clamp nut more towards one another as shown in FIG. 5. By this time the connectors and couplings 16, 17 have commenced joining and there is some resistance to overcome, hence the clamp nose lifts upwardly from the lower profile of the receptacle and the collet, held by engaging surface of the clamp nut, bears against the lower chamfer of the receptacle retaining ring 18. This position is retained as the rotation of the drive nut is continued to the final position shown in FIG. 6 where the housing 3 abuts the receptacle and the couplings and connectors are fully engaged.

In the vent that descent of the package is not gravity aided, for example in a horizontal orientation, then the clamp nut may move to the FIG. 5 position abutting the collet against the retaining ring 18 without the collet moving first to the FIG. 4 position.

The release mechanism is a simple reversal of the clamping steps. Anti-clockwise rotation of the drive nut and drive rod commences pushing the clamp nut downwardly to engage again on the lower profile of the receptacle as shown in FIG. 4. This releases the anchoring of the lower end of the collet, the detent engages and as the package is pulled upwardly the collet can flex inwardly to enable the male part of the clamp to be released from the receptacle.

In some instances the subsea environment or the length of time that a package is installed may give rise to situations where the drive nut and clamp seize together. In this situation rotation and over torque of the drive nut 5 will cause the drive pin 7 to shear. Rotation of the drive nut will then extend the siezed together drive rod and clamp nut, pushing apart the package and the structure, releasing the collet. The package may then be lifted away from the structure.

It will be appreciated that the drive rod of the described embodiment could be modified to comprise a hollow shaft and the receptacle could be replaced by a mounting that locates within a clamp nut arrangement.

An alternative embodiment of the invention is shown in FIGS. 7 and 8. In this embodiment when the drive nut is rotated to bring the housing and receptacle towards one another the projecting end of the rod 4 is taken up at the housing end of the rod rather than at the receptacle end projecting through the clamp nut. This is achieved by the top end of the drive rod threadingly engaging within an axial bore 22 in the drive nut which screws the rod up into the bore as the nut is rotated. The lower end of the drive rod is configured the same as the clamp nut of the first embodiment with a clamp nose portion 14 and a profile 21 for engaging detent 13 and no separate clamp nut is provided.

Figure 6:
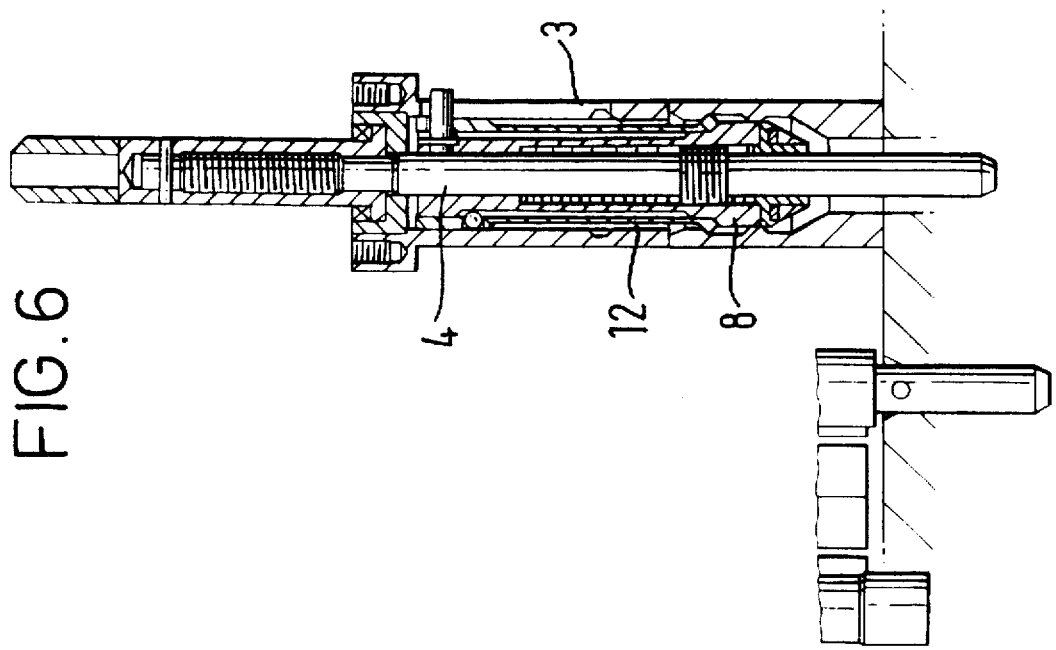
FIG. 6 shows the clamp of FIG. 1 in a fully clamped position.

When the drive nut is screwed to move the housing towards the receptacle as in FIGS. 4 to 6, instead of the rod 4 projecting downwardly through the clamp nut and receptacle, in this embodiment the rod moves upwardly into the drive nut bore. The profiled clamp nose end of the drive rod moves and cooperates with the floating collet and the receptacle in the same way as described for the clamp nose of the previous embodiment.

In both the described embodiments the collet acts as a floating locking member constrained to move between a first position in which lateral motion with respect to the clamp nose and receptacle is permitted, and a second position in which lateral motion is restricted. The collet slides from the first to second position after the clamp nose engages with a top surface in the receptacle, the collet and clamp nose then moving in unison to abut a second stop surface on the receptacle which prevents the abutting collet and clamp nose from being withdrawn any further from the receptacle.

We claim:

1. A screw action clamp assembly for clamping subsea structures, the assembly including a clamp for attachment to a first subsea structure and an anchorage receptacle for attachment to a second subsea structure, the clamp comprising:

a clamp head;

a rotatable drive member threadingly engaged with said clamp head for relative contracting and extending longitudinal travel with respect thereto in response to rotation of the drive member, the clamp head having an end portion for insertion into the anchorage receptacle; and a locking member having first and second ends, the first end being located more remote from the end portion of the clamp head and having a detent that engages to cause the locking member to be carried by the drive member during said relative longitudinal travel until relative contracting travel advances the second end of the locking member into abutment with a projection on the end portion of the clamp head and push-releases the detent at the first end of the locking member disengaging the locking member from relative travel with the drive member;

and in which the anchorage receptacle has a mouth portion through which the end portion of the clamp head and the second end of the locking member can pass into the anchorage receptacle when the second end of the locking member and the projection on the end portion are separated, and through which removal from the receptacle is prevented when said second end is abutting said projection.

2. The clamp assembly of claim 1 in which, when the end portion of the clamp locking member are engaged in the receptacle, further relative contracting longitudinal travel pulls the first and second subsea structures together.

3. The clamp assembly of claim 1 in which the end portion of the clamp head has a conical tip to aid coarse location into the mouth of the receptacle.

4. The clamp assembly of claim 1 in which the locking member comprises a collet disposed concentrically around the drive member, the second end of the locking member being outwardly flared to a greater diameter than the mouth of the receptacle, inwardly deflectable when separated from the projection on the end portion of the clamp head and restrained from deflection when abutting the projection.

5. The clamp assembly of claim 1 in which the clamp head is in the form of a nut and the drive member is in the form of a threaded rod.

6. The clamp assembly of claim 1 in which the clamp head has a threaded rod portion that engages in a threaded recess in the drive member.

7. The clamp assembly of claim 1 in which the drive member comprises, at its end remote from the clamp head, a drive nut engaged on a rod portion of the drive member via a thread and a pin, the pin being caused to shear in the event of seizure of the drive member and clamp head causing over torque on the drive nut, the drive rod and clamp nut then being extendible together via the thread, away from the drive nut.

8. The clamp assembly of claim 1 in which the drive member is rotatably journalled in a housing adapted to be attached to the first subsea structure.

9. A clamp assembly for clamping first and second subsea structures to one another, comprising:

a clamp for attachment to a first subsea structure;

an anchorage receptacle for attachment to a second subsea structure;

said clamp including a clamp head having an end portion for insertion into the anchorage receptacle, and a projection on said end portion, a rotatable drive member threadedly engaged with said clamp head for longitudinal movement relative to one another in response to rotation of said drive member, and a locking member having first and second ends, said first end being located more remote from the end portion of the clamp head than said second end, said first end having a detent for locking said locking member and said drive member to one another for joint longitudinal movement in a first direction relative to said clamp head a predetermined distance in response to rotation of said drive member, said second end of said locking member abutting the projection on the end portion of said clamp head in response to said joint longitudinal movement of said locking member and said driving member relative to said clamp head over said predetermined distance, said detent unlocking said drive member and said locking member from said joint longitudinal movement in said first direction in response to abutment of said second end of said locking member and said clamp head projection;

said anchorage receptacle including a mouth for receiving the end portion of said clamp head and said second end of said locking member, said second end of the locking member being spaced from the projection on the end portion of said clamp head and movable into engagement with said mouth in response to resistance to closing movement of the first and second subsea structures toward one another, said second end of said locking member abutting said mouth of said anchorage and said projection on the end portion of said clamp head to prevent removal of said clamp from said anchorage receptacle in response to further rotation of said drive member and longitudinal movement of said drive member in said first direction relative to said clamp head.

10. The clamp assembly of claim 9 including a housing carried by said drive member for non-rotational longitudinal movement therewith, said detent engaging between said housing and said locking member for joint longitudinal movement therewith in said first direction relative to said clamp head, said housing adapted to be attached to the first subsea structure.

11. The clamp assembly of claim 9 wherein the end portion of the clamp head has a conical tip to facilitate insertion of said clamp head end portion into the mouth of the receptacle.

12. The clamp assembly of claim 9 wherein the locking member comprises a collet disposed concentrically around the drive member, the second end of said collet being outwardly flared to a greater diameter than the mouth of the receptacle, inwardly deflectable when separated from the projection on the end portion of the clamp head and restrained from deflection when abutting the projection.

13. The clamp assembly of claim 9 wherein said clamp head is in the form of a nut and the drive member is in the form of a threaded rod.

14. The clamp assembly of claim 9 wherein said clamp head has a threaded rod portion that engages in a threaded recess in the drive member.

15. The clamp assembly of claim 9 wherein the drive member comprises, at its end remote from the clamp head, a drive nut engaged on a rod portion of the drive member via a thread and a pin, the pin being caused to shear in the vent of seizure of the drive member and clamp head causing over torque on the drive nut, the drive rod and clamp nut then being extendible together via the thread, away from the drive nut.

* * * * *